July 23, 1940.  W. H. STROM  2,208,649
TACKLE BOX
Filed June 1, 1937
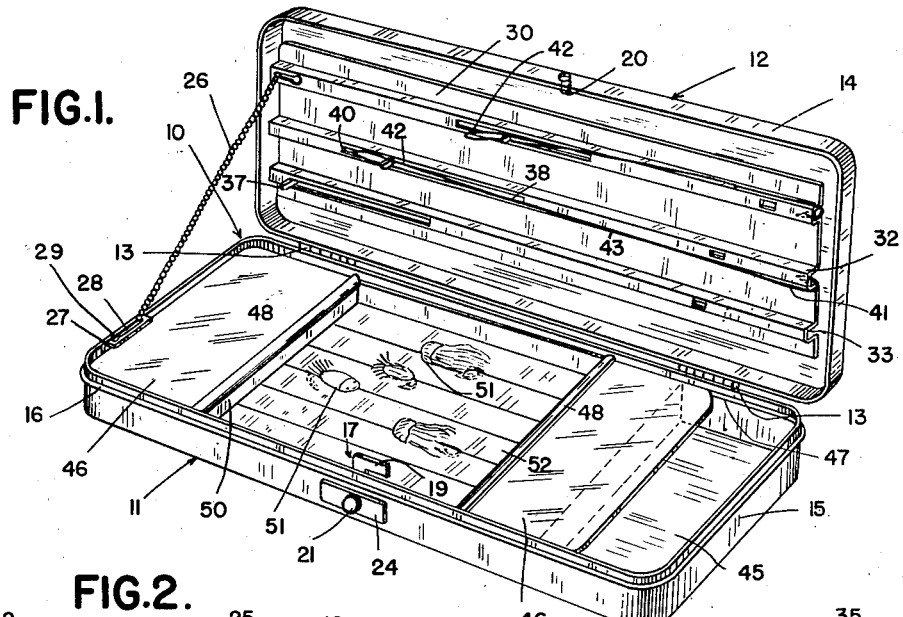
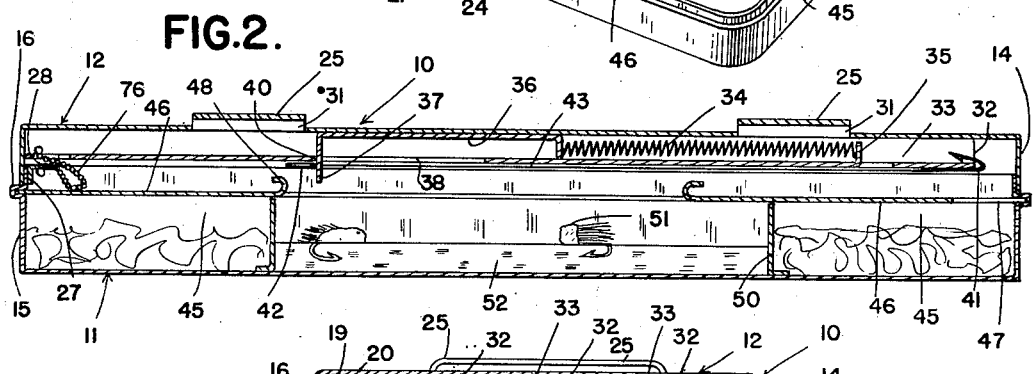
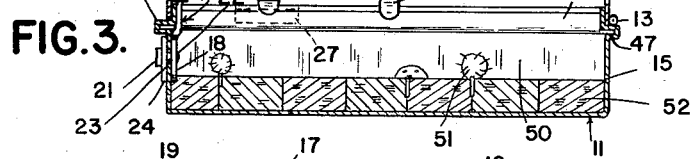
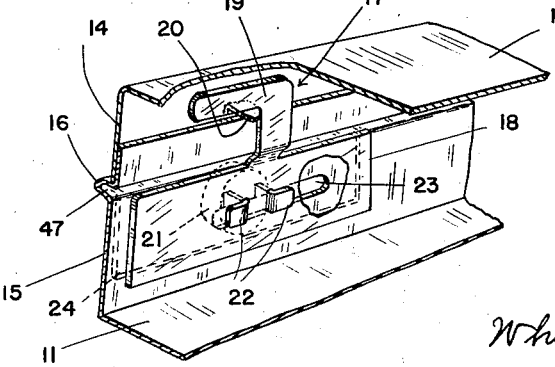
INVENTOR
WALTER H. STROM
BY
*Whittemore Hulbert & Belknap*
ATTORNEYS Patented July 23, 1940

2,208,649

UNITED STATES PATENT OFFICE 2,208,649

TACKLE BOX

Walter H. Strom, Detroit, Mich.

Application June 1, 1937, Serial No. 145,866

6 Claims. (Cl. 43—32)

This invention relates generally to fishing equipment and refers more particularly to improvements in tackle box constructions.

One of the principal objects of this invention is to provide a simple and inexpensive tackle box composed of a relatively few parts capable of being readily manufactured and assembled. In accordance with this invention, the tackle box comprises essentially a pair of hingedly connected sections cooperating with each other in their closed position to form the box proper and both of these sections are designed to permit the same to be readily formed from sheet metal stampings.

Another advantageous feature of the present invention resides in the novel means provided within the two sections of the box for accommodating fishing hooks and for supporting artificial bait, such as flies and the like.

A further object of this invention consists in the provision of a tackle box of the character set forth embodying means rendering it possible to suspend the box from the wearing apparel of the user in such a manner that the cooperating sections may be readily swung to their open positions without the necessity of detaching the box from its support on the wearing apparel of the user.

In addition to the foregoing, the present invention contemplates a tackle box of the character set forth in the preceding paragraph, so constructed that when the cooperating sections of the box are swung to their open positions, both the fish hooks and the artificial bait are readily accessible to the user. This feature, as well as the foregoing objects, will be made more apparent as the description proceeds, especially when considered in connection with the accompanying drawing, wherein:

Figure 1 is a perspective view of a tackle box constructed in accordance with this invention and showing the cooperating sections of the box in their open positions;

Figure 2 is a longitudinal sectional view through the tackle box;

Figure 3 is a cross sectional view through the tackle box shown in Figure 2; and Figure 4 is a perspective view, partly in section, illustrating the latch means provided to secure the cooperating sections of the box in assembled relationship.

Referring now more in detail to the drawing, it will be noted that there is illustrated in Figure 1 a tackle box 10 having superposed sections 11 and 12 hingedly connected together along adjacent longitudinal edges by means of the hinges 13. The section 12 is provided with a continuous laterally extending marginal flange 14 adapted to telescope the free edge portion of a corresponding marginal flange 15 extending laterally from the section 11. Upon reference to Figures 2 to 4, inclusive, it will be noted that the flange 15 is fashioned to provide a continuous outwardly extending inwardly opening return bent portion 16 adjacent the free edge of the flange 15 to form a seat for the free edge of the flange 14 in the closed position of the sections.

The cooperating sections are latched in their closed positions shown in Figures 2 to 4, inclusive, by means of a relatively simple catch 17 comprising a bolt 18 supported upon the inner surface of the flange 15 at the free longitudinal edge of the section 11 for sliding movement longitudinally of the flange and having a hooked portion 19 extending into the section 12 for cam engagement with an inwardly extending projection 20 struck from the flange 14. The bolt is manipulated from a point exteriorly of the tackle box by means of a control button 21 having lugs 22 extending through an elongated slot 23 in the flange 15 and bent over the bolt 18. The slot 23, through the flange 15, is concealed by means of a plate 24 movable with the control button 21 and secured by the latter at the outer side of the flange 15. With the above construction, it will be observed that when it is desired to open the tackle box, the control button 21 is merely slid in a direction to disengage the hook 19 from the projection 20 on the section 12 of the box. The two sections are then free to be relatively moved to their open positions shown in Figure 1.

In the present instance, the tackle box is designed to be supported from the belt of the wearer end, for accomplishing this result, the section 12 of the box is provided with longitudinally spaced straps 25 permitting the belt of the wearer to be readily slipped therethrough. As a result, the section 12 is supported adjacent the body of the wearer and, of course, the tackle box is arranged with the latch facing upwardly so that when the latch is released, the section 11 of the box will swing in a direction away from the wearer.

For the purpose of convenience in gaining access to the interior of the box, the section 11 is maintained in a substantially horizontal position when the tackle box is opened. For accomplishing this result, I provide a check 26 in the form of a flexible linear member having one end secured to the section 12 adjacent the swinging edge of the latter and having the other end secured to the section 11 in close proximity to the swinging edge of this section. The length of the check is such that when the tackle box is supported on the wearer in the manner previously set forth, the section 11 is held in a substantially horizontal position when the box is opened.

For securing the end of the check to the section 11, I provide a bracket 27 secured to the inner surface of the flange 15 at one end of the tackle box and having a portion extending inwardly from the flange 15 provided with a slot 28 elongated in a direction transversely of the section 11. As particularly shown in Figure 1, the end of the slot adjacent the free longitudinal edge of the section 11 is enlarged, as at 29, to receive an enlarged head portion on the adjacent end of the check and the remaining portion of the slot is sufficiently narrow to prevent the passage of the enlarged head therethrough. As a consequence, the check is assembled with the section 11 by merely extending the enlarged head through the portion 29 of the slot and sliding the check longitudinally of the slot to the position thereof shown in Figure 1. The opposite end of the check is similarly secured to the hook retaining plate 30 carried by the section 12 in a manner to be more fully hereinafter set forth.

Although the straps 25 may be in the form of separate strips of metal welded, or otherwise permanently secured to the top of the section 12, nevertheless, in the interests of simplicity and economy of manufacture, these straps are shown as struck outwardly from the section 12. The openings 31 resulting from the stamping operation are closed by the hook retaining plate 30 secured to the inner surface of the section 12 in the following manner.

The plate 30 is welded, or otherwise suitably secured, to the inner surface of the section 12 and is formed with a plurality of transversely spaced longitudinally extending channel-shaped portions 32. Upon reference to Figure 3, it will be noted that the channel portions 32 cooperate with the inner surface of the section 12 to form longitudinally extending compartments 33. Housed in each compartment 33 is a coil spring 34 having one end engaging a fixed abutment 35 in the form of a lug struck into the channel from the base portion of the latter. The opposite ends of the coil springs 34 engage slides 36 mounted in the compartments 33 for sliding movement longitudinally of the latter and having projections 37 extending inwardly through elongated slots 38 formed in the base portions of the channels 32. With this construction, it will be noted that the springs 34 normally maintain the slides in positions wherein the lugs 37 abut the extreme edges 40 of the slots 38 and that movement of the slides in a direction toward the springs serves to compress the latter.

The above arrangement is particularly advantageous in securing fish hooks with their leaders in position in the tackle box. As shown, this is accomplished by merely engaging the fish hooks 41 over the ends of the channels 32 adjacent the fixed abutments 35 and by slipping the loops 42 on the extremities of the leaders 43 over the projections 37 on the slides 36 by moving the latter longitudinally of the channels to register the projections 37 with the loops 42. As a consequence, the springs 34 maintain the leaders 43 under tension and thereby prevent accidental disengagement of the hooks 41 from the ends of the channels 32. In actual practice, the slots 38 through adjacent channels 32 are spaced varying distances from the ends of the channels in order to compensate for hooks having different lengths of leaders.

The section 11 of the box is provided with two compartments 45 at opposite ends for receiving incidental accessories, and these compartments are independently closed by means of closure plates 46 slidably mounted in the grooves 47 formed by the return bent portion 16. As shown in Figures 1 and 2, the adjacent edges of the two closure plates 46 are curled upwardly, as at 48, to provide a grip enabling the plates to be manipulated.

The space in the section 11 between the adjacent side walls 50 of the compartments 45 may be used to accommodate the artificial bait including the flies 51. The flies are supported in fixed relationship in the section 11 by means of a plurality of resilient strips 52 extending longitudinally of the section 11 between the walls 50 of the compartments 45 and having the adjacent edges abutting each other. If desired, the strips 52 may be formed of cork or rubber and in any case are sufficiently resilient to permit the hooks on the flies to be inserted between the adjacent longitudinal edges of the strips in the manner clearly shown in Figure 3.

It will be observed from the foregoing that I have provided a relatively simple and compact tackle box constructed to permit effective use of all of the available space in the box. It will also be observed that all of the several sheet metal parts including the two sections 11 and 12 may be formed from sheet metal stampings, with the result that the construction may be inexpensively manufactured.

What I claim as my invention is:

1. In a tackle box, a section provided with a continuous side wall and having an elongated channel portion adapted to engage a fish hook at one end thereof, a slide supported in the channel for movement longitudinally of the latter and having a projection extending through an elongated slot in one wall of the channel for engagement with a leader on the fish hook, and a spring housed within the channel and engageable with the slide to urge the same in a direction away from the portion of the channel engaged by the hook to tension said leader.

2. In a tackle box, a receptacle adapted to contain fishing equipment, a cover for the receptacle having an elongated channel therein adapted to be engaged at one end by a fish hook, a slide supported in the channel for movement longitudinally thereof and having a portion projecting through an elongated slot in one side wall of the channel for engagement with a leader on the hook, and a spring housed within the channel and engageable with the slide to urge the latter in a direction to maintain the hook in engagement with the end aforesaid of the channel.

3. In a tackle box, a receptacle adapted to contain fishing equipment, a cover for the receptacle, a plate secured to the inner surface of the cover and having an elongated channel portion cooperating with the cover to form a compartment adapted to receive the free end of a fish hook, a slide supported in the compartment for movement longitudinally of the latter and having a projection extending through an elongated slot in one side wall of the compartment for engagement with the leader on the other end of the hook, and a spring housed in the compartment and engageable with the slide to move the latter in a direction to maintain the hook in assembled relation with the plate.

4. In a tackle box, a receptacle adapted to contain fishing equipment, a cover for the receptacle, a one piece plate secured to the inner surface of the cover and formed with an elongated U-shaped channel portion adapted to engage a fish hook at one end thereof and having its open side facing the cover and cooperating therewith to form a compartment, a slide supported in the compartment for movement longitudinally of the latter and having a projection extending through an elongated slot in the base of the U-shaped channel portion of the plate for engagement with a leader on the fish hook, a projection struck inwardly from one side of the channel portion, and a spring housed in the compartment formed by the channel portion of the plate and the inner surface of the cover and engageable with said projection and said slide to urge the latter in a direction away from the portion of the channel engaged by the hook to tension said leader.

5. In a tackle box, a section forming a receptacle open at the top thereof, a second section shaped to form a closure for the top of the receptacle, a plate secured to the inner surface of one side wall of one of the sections and having an elongated channel-shaped portion arranged with the open side thereof facing said surface and closed by the latter, one end of the channel adapted to be engaged by a fish hook having a leader, a slide mounted within the channel for movement longitudinally of the latter and having a projection extending through an elongated slot in one wall of the channel for engagement with the leader on the hook, and a spring housed in the channel and engageable with the slide to yieldably urge the latter in a direction to maintain the hook in assembled relation with the end aforesaid of the channel.

6. In a tackle box, a section forming a receptacle open at the top thereof, a second section shaped to form a closure for the open top of the receptacle, a plate secured to the inner surface of one side wall of one of the sections and having a plurality of laterally spaced elongated channel-shaped portions arranged with the open sides thereof facing said surface and closed by the latter, one end of each channel adapted to be engaged by a fish hook having a leader, a slide supported in each channel for movement longitudinally of the latter and each slide having a projection extending through an elongated slot in one side wall of each channel for engagement with the leader of the hook engaged with the end of the associated channel, and a spring housed in each channel and acting upon the associated slide to maintain the hooks in assembled relation with the ends of the channels.

WALTER H. STROM.